United States Patent [19]

Rousos et al.

[11] 3,947,769

[45] Mar. 30, 1976

[54] THRESHOLD CORRECTION SYSTEM IN FSK TRANSMISSIONS

[75] Inventors: William Nicholas Rousos, Hacienda Heights; Robert Bruce Denny, Poway, both of Calif.

[73] Assignee: Hoffman Electronics Corporation, El Monte, Calif.

[22] Filed: Oct. 23, 1974

[21] Appl. No.: 517,384

[52] U.S. Cl. .................................. 325/320; 178/88

[51] Int. Cl.$^2$ ...................... H04B 1/12; H04L 27/14

[58] Field of Search ....... 325/320, 321, 326; 178/88

[56] References Cited

UNITED STATES PATENTS

| | | | |
|---|---|---|---|
| 2,476,990 | 7/1949 | Mason | 178/88 |
| 2,999,925 | 9/1961 | Thomas | 325/320 |
| 3,348,153 | 10/1967 | Featherston | 325/320 |
| 3,372,234 | 3/1968 | Bowsher et al. | 178/88 |
| 3,473,131 | 10/1969 | Perkins, Jr. | 328/163 |

*Primary Examiner*—Robert L. Griffin
*Assistant Examiner*—Marc E. Bookbinder
*Attorney, Agent, or Firm*—Lyon & Lyon

[57] ABSTRACT

A demodulator produces mark and space signals in response to mark and tone signals received from a radio receiver. The signals after detection are in the form of characteristic tones and are separated by corresponding band pass filters. After separation, AM detection of the mark and space signals is accomplished in envelope detectors whose output voltages are D.C. voltages. In the absence of noise, the detector voltages are essentially a rounded off version of the binary signal (mark) and a rounded off version of the complement (space) of the binary signal. These voltages are compared and their difference, a binary signal, after filtering is applied to a system which automatically computes a mark-space decision threshold for a comparator or slicer such that the slicer produces a mark output when the filtered output is above the threshold and a space output when the signal is below the threshold to achieve optimum detection of the mark-space data during fading of either one or both of the carrier waves on which such data is transmitted to the radio receiver. The optimum decision threshold is computed from the signal peaks which are stored in two peak detectors, one for the positive peak and one for the negative peak. The peak detectors are periodically discharged to allow a fresh peak to be stored and the discharge circuits obtain their cues from state changes observed at the slicer output. Hence the decisions themselves signal the timing of the discharge of the peak detectors. A delay network ensures that the charge stored by each peak detector is not caused by noise; and also a sequencing logic circuit prevents the same detector from being discharged twice in a row thereby providing additional immunity to noise.

7 Claims, 5 Drawing Figures

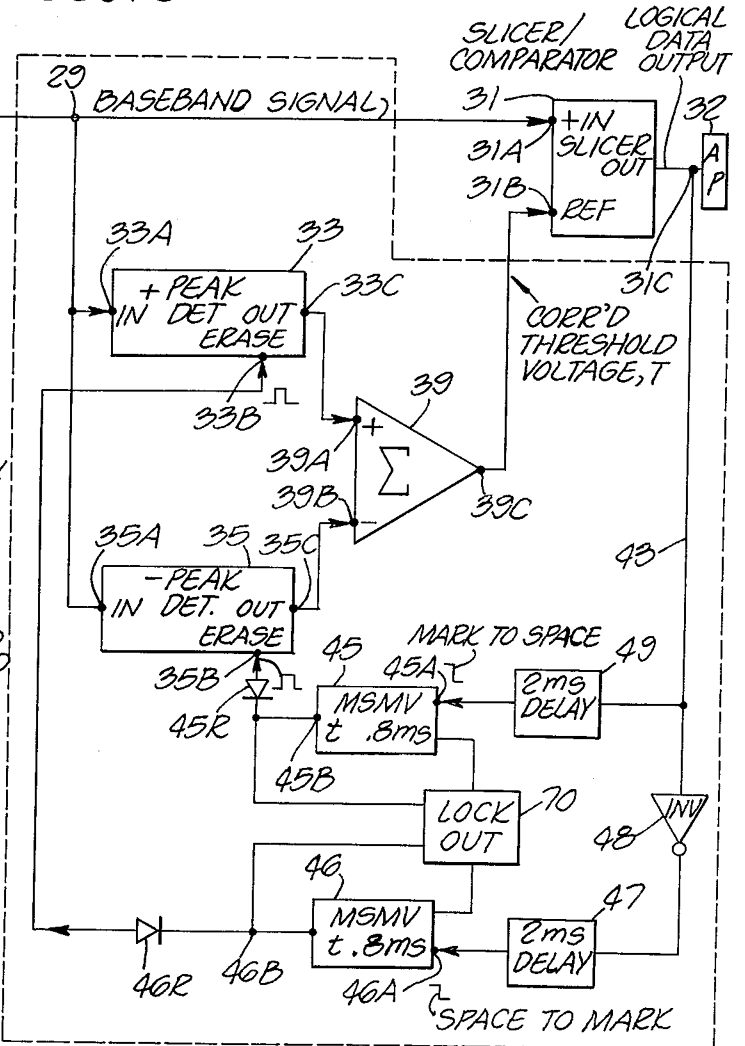

FIG. 1.
BASEBAND SIGNAL
SLICER/COMPARATOR
LOGICAL DATA OUTPUT
+IN
SLICER
OUT
REF
+PEAK DET
IN OUT
ERASE
CORR'D THRESHOLD VOLTAGE, T
-PEAK DET.
IN OUT
ERASE
MARK TO SPACE
2ms DELAY
MSMV t .8ms
LOCK OUT
INV
SPACE TO MARK

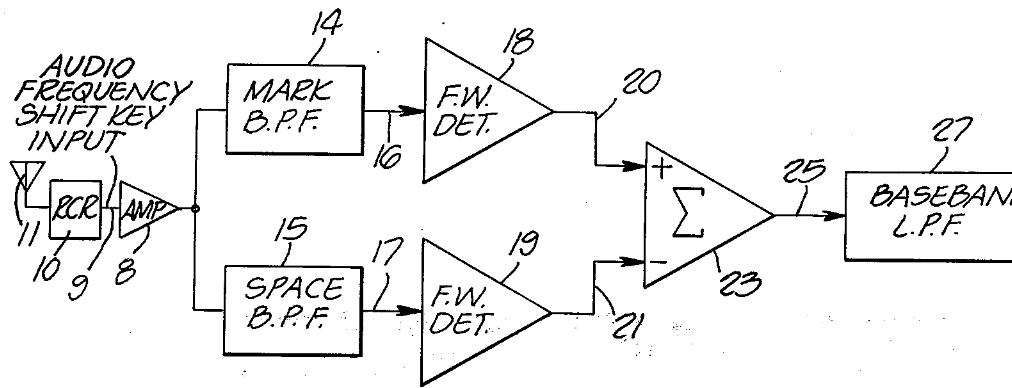

AUDIO FREQUENCY SHIFT KEY INPUT
RCR
AMP
MARK B.P.F.
SPACE B.P.F.
F.W. DET.
F.W. DET.
BASEBAND L.P.F.

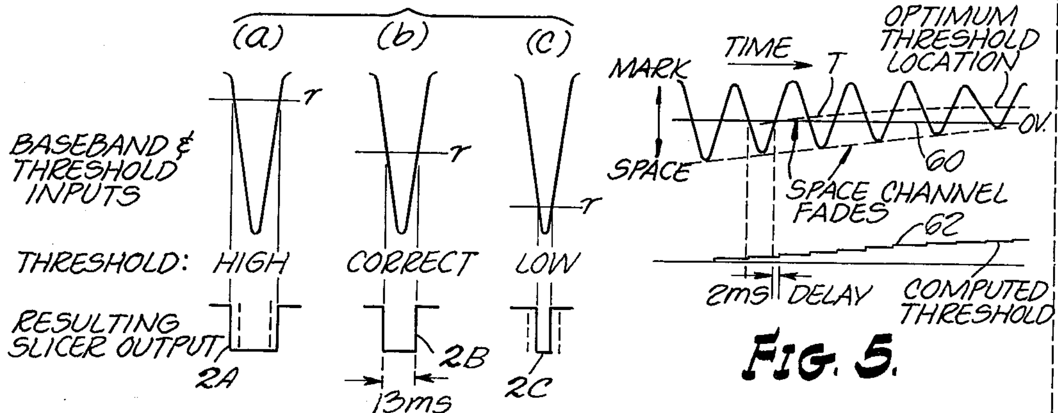

FIG. 2.
BASEBAND & THRESHOLD INPUTS
THRESHOLD:
HIGH
CORRECT
LOW
RESULTING SLICER OUTPUT
13ms
FIG. 5.
OPTIMUM THRESHOLD LOCATION
TIME
MARK
SPACE
SPACE CHANNEL FADES
2ms DELAY
COMPUTED THRESHOLD

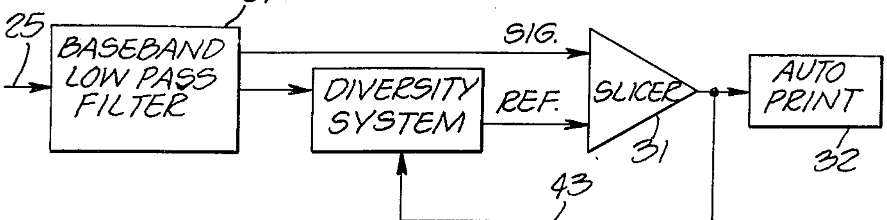

FIG. 3.
BASEBAND LOW PASS FILTER
DIVERSITY SYSTEM
SIG.
REF.
SLICER
AUTO PRINT

P.M.
32E
32D
32C
32
46
46B
46A
IC9A
IC9B
45B
45R
46R
45A
45
IC8B
IC8C
70
49
47
31
31A
31B
31C
IC1D
39
39C
IC5
IC4
39A
39B
33
33C
IC2
IC1A
33A
33B
35
35C
IC3
IC1B
35A
35B
IC6
IC7
43K
43
IC8A
48
+5V.
P
29

THRESHOLD CORRECTION SYSTEM IN FSK TRANSMISSIONS

The present invention relates to improved means and techniques particularly useful in the recovery of data transmitted over different radio frequency carriers in the form of digital type information when, as is usually the case, one or both of such carriers and the data transmitted thereon fades in intensity.

It is therefore, an object of the present invention to provide improved means and techniques whereby such data may be recovered in satisfactory form notwithstanding the various conditions of fading.

A specific object of the present invention is to provide an improved demodulator for so called audio frequency shift key (FSK) signals.

Another specific object of the present invention is to provide a system of this character which continuously and automatically effects comparisons in accordance with each change from a mark signal to a space signal and vise versa.

Another specific object of the present invention is to provide an improved system of this character in which a threshold voltage for production of correctly spaced mark and space signals is adjusted automatically in accordance with that particular mark or space signal which is being received.

Another specific object of the present invention is to provide an improved system of this character in which adjustment of such threshold voltage involves a means, such as, for example, a peak detector which is first conditioned to receive new information of the mark or space signal then present by effective prior erasure of old information derived from prior mark or space signals, as the case may be.

Another specific object of the present invention is to provide improved means and techniques which are particularly useful in rendering a system of this character immune or fool proof with respect to random noise and transient conditions to which the system should not respond.

Other objects and advantages of the present invention will be apparent from the following description, reference being made to the accompanying drawings wherein:

FIG. 1 represents in block diagram form and partly in schematic form a portion of a radio receiver involving novel demodulating means embodying features of the present invention.

FIG. 2 illustrates three different conditions as a part of the description of the present invention.

FIG. 3 is a block diagram illustrating in more general form some of the apparatus illustrated in FIG. 1.

Figure 4:
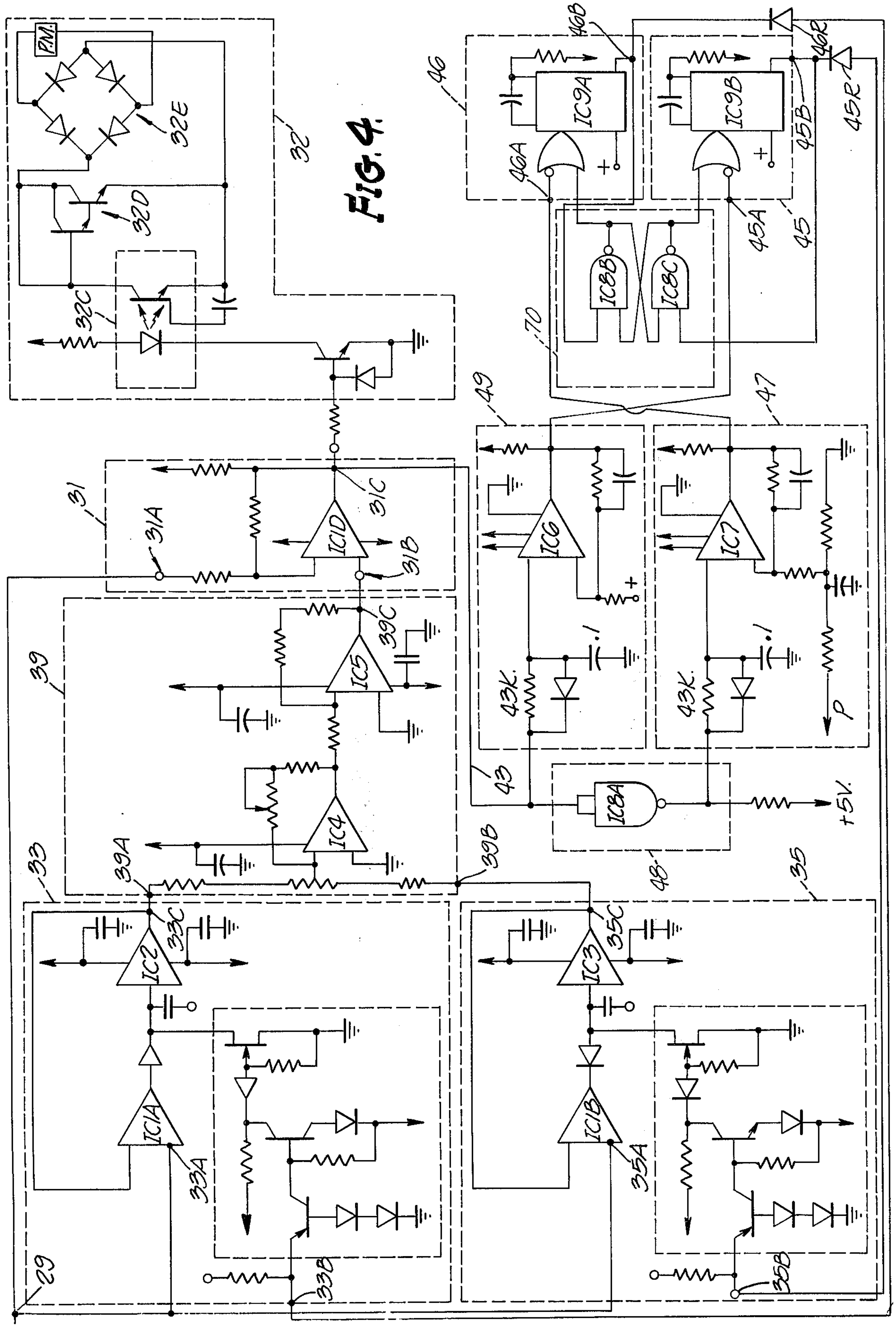
FIG. 4 illustrates in more detail and in schematic form apparatus illustrated in FIG. 1.

FIG. 5. illustrates corrective action during fading.

Referring to FIG. 1, the present invention involves the use of an output signal on lead or terminal 9 derived from conventional radio wave receiving means 10 which includes antenna means 11 for the reception of radio frequency single side band waves having different carrier frequencies. Such waves after reception are converted into electrical currents or voltages which are suitably amplified, converted and demodulated in conventional means 10 so as to produce signals at terminal 9, such signals being in the range of audio frequencies and are referred to in FIG. 1 as the audio frequency shift key input or, in short, an FSK signal.

Such receiving means 10 is tuned to the side of the individual carrier frequencies for reception of the FSK signal.

The terminal 9 is the input terminal of the demodulator circuit which is represented in FIG. 1 and involves an amplifier stage 8 and two bandpass filters 14, 15 whose function is to separate the two tones of the FSK signal on terminal 9 with a so called "mark" signal appearing on lead 16 and a so called "space" signal appearing on lead 17. These mark and space signals are then applied to full-wave detector circuits 18 and 19 respectively each of which develops an output on corresponding leads 20, 21 that follows the envelopes of the signals on corresponding leads 16, 17. These detector output voltages or signals on leads 20, 21 are proportional to the square-root of the energy present at and about their respective tone-channel filter frequencies.

The signals on leads 20, 21 are applied to a summation network 23 which functions to effectively subtract the voltage on leads 20, 21 with a difference voltage being developed on lead 25, such difference voltage being representative of the channel (either mark or space) with the most energy about its center frequency at that particular instant.

In FSK transmissions, a signal is transmitted at one carrier frequency when a "mark" signal is transmitted and at another carrier frequency when a "space" signal is transmitted. The signal on lead 25 may be referred to as a "bipolar baseband signal" and is applied to a low pass filter 27 for noise reduction purposes. The output of filter 27 appears at junction point 29 with the baseband signal at junction point 29 being applied simultaneously to one input terminal 31A of a so called "slicer" network 31 and also input terminals 33A, 35A of peak detector circuits 33 and 35 respectively.

The slicer network 31 functions to produce an output signal on output terminal 31C in the form of a logical 1 signal when the input baseband signal on terminal 29 swings or changes to the "mark" side of zero volts, and to produce an output signal in the form of a logical 0 signal when the input baseband signal swings or changes to the "space" side of zero volts. The signal at terminal 31C is applied to automatic printing means 32 and also to other circuitry as described later.

The point about which the slicer 31 decides whether to output a logical 0 or a logical 1, referred to as the "decision threshold", need not be zero volts but that voltage applied to the other input terminal 31B. Imbalance anywhere in the demodulator ahead of the slicer 31 can be corrected by setting the decision threshold voltage at a point substantially midway between the positive and negative peaks of the baseband signal thus assuring equal "mark" and "space" pulse widths as illustrated in FIG. 2 wherein three conditions namely a "high" a "correct" and a "low" condition are illustrated with the threshold T in FIG. 2*b* being correctly set to achieve an output signal duration at 2B which is neither too long as at 2A in FIG. 2*a* nor too short as at 2C in FIG. 2*c*. See also the following description of FIG. 5.

In accordance with important features of the present invention the threshold voltage T is continuously revised in accordance with fading conditions which the two carrier waves undergo in their transmission from a remotely located transmitter means to the receiver which receives both such carriers, one of which carrier waves transmits the "mark" signal and the other of which transmits the "space" signal.

The invention uses to advantage the fact that the fading envelopes of the "mark" and "space" signals or tones have a low cross correlation coefficient, i.e. when one tone (space or mark carrier) has faded, chances are very good that the other tone has not. This frequency - selective fading phenomenon yields a diversity effect when the demodulator is capable of adjusting its decision theshold in a dynamic fashion to correct for the continually changing system imbalance caused by the independent fading of the "mark" and "space" tone carriers. It is important to operation of printing means 32 that the ratio of "mark" to "space" pulse widths remain as nearly as possible to unity. Early and-/or late state transitions, caused by improper decision threshold voltage on terminal 31B, referred to as bias distortion, cause increased susceptibility to noise in asynchronous start-stop type system.

In accordance with features of the present invention a threshold correction system is provided which is capable of following very fast changes in amplitude of a carrier under amplitude fading conditions and yet is capable of storing voltages, (whether derived from a peak detector, integrator or other means) for several seconds without appreciable changes so as to maintain correct decision threshold voltage during reception of long strings of one bit type or during hand sending.

The threshold voltage applied to input terminal 31B is derived using the peak detectors 33, 35 each having their input terminal 33A, 35A connected to terminal 29 and their corresponding output terminal 33C, 35C connected to corresponding input terminals 39A, 39B of summation network 39 whose output terminal 39C is connected to slicer input terminal 31B.

One detector 33 stores the positive peaks of the baseband signal on terminal 39A and the other detector 35 stores the negative peaks. These detectors 33, 35 have extremely long time constants, approximately 90 seconds and thus provide an essentially infinite storage time with respect to the bit rate. Dynamic correction is made by periodic complete erasure of the peak voltages in the detectors, followed by storage of new peak values. Specifically as described in more detail herein the previously developed negative (−) peak voltage in detector 35 is erased immediately following the negative-going baseband signal transition of the threshold, — just before a new negative peak is reached, thus allowing storage of the new negative peak. Likewise, the previously developed positive peak voltage in detector 35 is erased immediately following the positive-going transition past the decision threshold, — just before the new positive peak is reached, thus allowing storage of the new positive peak. This erasure of peak detector voltage is caused by the transition of the baseband signal at terminal 29 (or 31A) by the threshold voltage then present at slicer input terminal 31B with such transition being manifest in the form of a signal developed at the slicer output terminal 31C, which signal is fed back via lead 43 to input terminals 45A and 46A of corresponding identical multivibrators 45, 46, such signals being applied to terminal 46A through inverter stage 48 and delay network 47 and to terminal 45A through delay network 49.

The output of each of these multivibrators 45, 46 appearing at corresponding output terminals 45B, 46B is applied through corresponding diodes 45R, 46R to corresponding input erase terminals 33B, 35B of peak detectors 33, 35 so as to modify their outputs appearing at terminals 33C, 35C. Thus, a "mark " to "space" transition at the output of slicer 31 (terminal 31C) is used to trigger momentary erasure of the "space" peak detector 35 (through multivibrator 45). This erasure occurs shortly after the beginning of the arrival of "space" information and is of short duration so that the "space" peak detector 35 may completely recover and develop at its output a signal representative of the energy content of the "space" information still being received. Likewise, erasure and development of a signal at the output of detector 33 occurs in response to arrival of "mark" information.

The threshold signal at terminal 31B is computed using only the immediately precdeing positive and negative peak values, rather than an average over many bits, and is recomputed immediately following each new transition. This allows the threshold to follow fading envelopes having components frequencies approaching 1/10 the bit rate with substantially no induced bias. Rapid fading typifies multipath conditions when the time blurring induced by the multiple paths becomes a significant portion of the bit duration. The arrangement provides clearly superior reception and clearly less bias distortion during reception of characters containing strings of one bit type.

FIG. 5 represents the condition when the "space" information continuously fades and the "mark" information is transmitted without substantial fading. The zero voltage line is the horizonal line 60 and it will be seen that each of the "mark" signal peaks is equidistant from line 60 but due to fading each succeeding peak of the "space" signal becomes closer to the zero line 60. To counteract this condition the threshold voltage applied to input terminal 31B is periodically computed essentially 2 miliseconds after (2 milisecond delay in networks 49, 47) transition at terminal 31C as indicated by the stepped rising line 62 so that the actual threshold voltage T then extends equidistant between the peaks of the "mark" and "space" signals to obtain the correct slicer output pulse width discussed above in connection with FIG. 2*b*.

To prevent spurious operation because of transients and noise immunity means are incorporated and these include the use of the delay networks 47 and 49 and also the lock out means 70 which prevents either one of the two multivibrators 45, 46 from being operated twice in succession, i.e. without an intermediate operation of the other multivibrator 45, 46. The delay networks 47, 49 are particularly useful in preventing a narrow noise spike from being interpreted either as a valid transition from "space" to "mark" or as a valid transition from "mark" to "space."

The sequence flip-flop or lock out means 70 is cross-connected between the monostable multivibrators 45 or 46 to prevent the same multivibrator either 45 or 46 from being discharged twice in a row. This prevents unwanted discharge or erasure of a peak detector 33, 35 in response to a noise pulse which may appear after the above mentioned 2 millisecond time interval.

The lock out means 70 as seen in FIG. 4 involves essentially NAND gates connected as an RS flip-flop. The discharge pulse, for example, from multivibrator 46 sets the flip flop in 70 one which locks out multivibrator 46. To fire multivibrator 45 two conditions must exist, namely first there must be a negative going pulse, and a high voltage must exist on one terminal of the multivibrator. Such high voltage an enabling voltage is effectively switched between multivibrators 45, 46 by the flip flop circuitry 70.

The delay networks 47, 49 may take different forms, of course, and as illustrated in FIG. 4 they involve comparators with an RC charge up circuit that may be discharged however in very short time. After 2 miliseconds the output of IC6 and IC7 is a positive going pulse and those are used, provided the associated multivibrator is not locked out, to fire such dual tone short monostable multivibrator to cause erasure in the associated peak detector and also to lock itself out.

IC8 in FIG. 4 for achieving lockout may be a quadruple NAND gate.

It will be appreciated that the individual peak detectors 33,35 each, until their corresponding output signals is erased, acts as a storage or memory device. When one of such detectors 33,35 has its output signal revised in accordance with the intensity of the prevailing polarity of the baseband signal, the other output signal of the other detector 33,35 remains substantially constant and is compared in comparator 39 with the revised output signal. It will be appreciated by those skilled in the art having the benefit of the teachings herein that means other than peak detectors may be used to perform the functions and achieve the results of peak detectors i.e. to effectively measure the "mark" or "space" channel amplitude during such "mark" interval as described in more detail above. In such case the means 33 measures that amplitude in the "mark" channel and makes necessary revision in the control signal at terminal 39A, the signal on terminal 39B remaining substantially constant and then when a transition or change from "mark" transmission to "space" transmission occurs the previously developed signal on terminal 39A remains substantially constant with the signal on 39B now being revised in accordance with the then prevailing "space" transmission.

Various conventional uses may be made of the data pulses appearing on output terminal 31C. For example, as shown in FIG. 4 such data signals may be applied to a light emitting diode circuit 32C and the ouput of that circuit after amplification in amplifier stage 32D and rectification in rectifier 32E may be applied to printing means P.M.

While the particular embodiments of the present invention have been shown and described, it will be obvious to those skilled in the art that changes and modifications may be made without departing from the invention in its broader aspects and, therefore, the aim in the appended claims is to cover all changes and modifications as fall within the true spirit and scope of this invention.

We claim:

1. In a radio receiving system which includes means for receiving two carrier waves that are subject to different fading in their transmission from a remote location, and means for deriving two sequential signals with each of said signals corresponding respectively to a corresponding one of said carrier waves, a variable threshold level detector comprising: first means responsive to said deriving means for producing a bipolar baseband signal which is representative of differences in amplitude for each respective sequwntial signal with positive amplitudes of said baseband signal being in accordance with one of said sequential signals and negative amplitudes of said baseband signal being in accordance with the other one of said sequential signals, second means coupled to said first means and comprising first control signal producing means and first conditioning means for conditioning said first control signal producing means to derive a first control signal representative of the positive amplitude of said baseband signal, third means coupled to said first means and comprising second control signal producing means and second conditioning means for conditioning said second control signal producing means to derive a second control signal representative of the negative amplitude of said baseband signal, fourth means coupled to said second and third means for comparing said first and said second control signals and deriving a threshold control signal in accordance with the difference in amplitude of said first and said second control signals, fifth means coupled to said first and fourth means for comparing said baseband signal and said threshold control signal and producing a data output signal, sixth means responsive to change in polarity of said data output signal from a negative amplitude to a positive amplitude to operate said first conditioning means, seventh means responsive to changes in polarity of said data output signal from a positive amplitude to a negative amplitude to operate said second conditioning means, said first and second control signal producing means after being conditioned by operation of their corresponding first and second conditioning means being thereafter receptive to change in the corresponding postive and negative amplitude of said bipolar signal to correspondingly change said first and second control signals.

2. In a radio receiving system which includes means for producing two sequential signals derived from two corresponding carrier waves that are subject to different fading in their transmission from a remote location, and a threshold means for indicating which of said two carrier waves is received at any instant, the improvement comprising: a source of bipolar baseband signal responsive to said producing means, said bipolar baseband signal being representative of differences in magnitude of sequential signals with magnitudes of one polarity being in accordance with one of said sequential signals and magnitudes of the other polarity of said bipolar signal being in accordance with the other one of said sequential signals, first means coupled to said source and comprising first control signal producing means and first conditioning means for conditioning said first control signal producing means to produce a first control signal representative of said one polarity, second means coupled to said source and comprising second control signal producing means and second conditioning means for conditioning said second control signal producing means to produce a second control signal representative of said other polarity, third means responsive to said threshold means output such that a change in polarity from said other polarity to said one polarity in said output renders said first conditioning means effective to condition said first control signal producing means to produce said first control signal, fourth means responsive to said threshold means output such that a change in polarity from said one polarity to said other polarity in said output renders said second conditioning means effective to condition said second control signal producing means to produce said second control signal, fifth means coupled to said first and said second means for comparing said first and second control signals and deriving a threshold control signal from said comparison, said threshold means coupled to said source and to said comparing means and functioning to compare said baseband signal with said threshold control signal and producing an output signal of changing polarity with each polarity portion having its duration controlled in accordance with said threshold control signal, seventh means coupling said threshold means to said third means such that said third means is responsive to change in polarity of said output signal, and eighth means coupling said threshold means to said fourth means such that said fourth means is responsive to change in polarity of said output signal.

3. A system as set forth in claim 2 in which said first and said second control signal producing means each includes a peak detector circuit for producing said first and second control signals.

4. A system as a set forth in claim 2 in which said third and fourth means each includes a multivibrator circuit controlled by changes in polarity of said output signal and producing an output which is applied respectively to said first and said second conditioning means to condition said first and second control signal producing means for production respectively of said first and said second control signals.

5. A system as set forth in claim 4 in which said first and said second control signal producing means each includes peak detection means having an input terminal coupled to said source and an erase terminal coupled to the output terminal of the corresponding multivibrator circuit.

6. A system as set forth in claim 5 wherein said seventh means comprises delay means interposed between the output of said threshold means and each control terminal of said multivibrators for delaying operation of said multivibrators for a time of approximately 2 miliseconds to prevent their operation during such time.

7. A system as set forth in claim 6 including means interconnected between said multivibrators to prevent non sequential operation of said multivibrators.

* * * * *